(12) United States Patent
Patey et al.

(10) Patent No.: US 10,083,194 B2
(45) Date of Patent: Sep. 25, 2018

(54) PROCESS FOR OBTAINING CANDIDATE DATA FROM A REMOTE STORAGE SERVER FOR COMPARISON TO A DATA TO BE IDENTIFIED

(71) Applicant: Morpho, Issy-les-Moulineaux (FR)

(72) Inventors: Alain Patey, Les Moulineaux (FR); Herve Chabanne, Issy les Moulineaux (FR); Julien Bringer, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 278 days.

(21) Appl. No.: 14/771,788

(22) PCT Filed: Mar. 11, 2014

(86) PCT No.: PCT/EP2014/054697
§ 371 (c)(1),
(2) Date: Aug. 31, 2015

(87) PCT Pub. No.: WO2014/140009
PCT Pub. Date: Sep. 18, 2014

(65) Prior Publication Data
US 2016/0019211 A1    Jan. 21, 2016

(30) Foreign Application Priority Data
Mar. 11, 2013 (EP) .................................... 13305268

(51) Int. Cl.
*G06F 17/30* (2006.01)
*H04L 9/00* (2006.01)
*H04L 9/32* (2006.01)

(52) U.S. Cl.
CPC .... *G06F 17/3033* (2013.01); *G06F 17/30342* (2013.01); *H04L 9/00* (2013.01); *H04L 9/3236* (2013.01)

(58) Field of Classification Search
CPC ........... G06F 17/3033; G06F 17/30342; G06F 17/30067; G06F 17/30949;
(Continued)

(56) References Cited

U.S. PATENT DOCUMENTS 8,706,701 B1 * 4/2014 Stefanov ........... G06F 17/30197
707/687
9,729,548 B2 * 8/2017 Patey ....................... H04L 9/00
(Continued)

FOREIGN PATENT DOCUMENTS

WO    WO-2012093216    7/2012

OTHER PUBLICATIONS

European Search Report and Written Opinion, dated Apr. 9, 2014, European Application No. 13305268.
(Continued)

*Primary Examiner* — Greta L Robinson
(74) *Attorney, Agent, or Firm* — Womble Bond Dickinson (US) LLP

(57) ABSTRACT

The invention presents a process for obtaining candidate reference data to compare to a data to be identified, implemented in a system comprising a client unit and a storage server comprising two databases, in which: —the first database comprises indexed memory blocks each comprising a corresponding encrypted indexed reference data, and —the second database comprises memory blocks indexed by all possible hash values obtained by a plurality of k indexed hash functions, and wherein each block contains a list of the indexes of the reference data which hashing by one of said hash function results in the hash value corresponding to said block, said process comprising the steps during which: —the client unit hashes the data to be identified with each of the plurality of hash functions, and reads the k memory blocks of the second database corresponding to the hash values thus
(Continued)

obtained, the client unit identifies indexes contained in at least t out of k read memory blocks, and —the client unit reads the memory blocks of the first database indexed by the identified indexes in order to obtain the corresponding indexed reference data, said data being candidate data to compare to the data to be identified, the steps of reading memory blocks of the databases being carried out by executing a protocol preventing the storage server from learning which memory blocks of the databases are read. Another object of the invention is a system for the secure comparison of data.

10 Claims, 3 Drawing Sheets

(58) Field of Classification Search
CPC ......... G06F 17/30151; G06F 17/30097; H04L 9/00; H04L 9/3236
USPC .......................................................... 707/798
See application file for complete search history.

(56) References Cited

U.S. PATENT DOCUMENTS

| | | | |
|---|---|---|---|
| 2001/0025342 A1* | 9/2001 | Uchida | H04L 9/3231 |
| | | | 713/186 |
| 2007/0005511 A1* | 1/2007 | Martinez | G06Q 20/367 |
| | | | 705/67 |
| 2007/0046476 A1* | 3/2007 | Hinkamp | A61B 5/1171 |
| | | | 340/573.1 |
| 2009/0074259 A1* | 3/2009 | Baltatu | G06K 9/00288 |
| | | | 382/118 |
| 2010/0033304 A1* | 2/2010 | Takagi | G06F 21/32 |
| | | | 340/5.83 |

OTHER PUBLICATIONS

International Search Report and Written Opinion, dated Sep. 18, 2014, Application No. PCT/EP2014/054697.
Bringer, Julien, et al., "Identification with Encrypted Biometric Data", Retrieved from the Internet: http://arvix.org/pdf/0901.1062v2.pdf, (Sep. 7, 2009).
Kozak, Stepan, et al., "Secure Metric-Based Index for Similarity Cloud", *Secure Data Managment*, (Aug. 27, 2012), 130-147.
Kuzu, Mehmet, et al., "Efficient Similarity Search over Encrypted Data", 28th International Conference on Data Engineering, (Apr. 1, 2012), 1156-1167.
Lu, Steve, et al., "How to Garble RAM Programs", *International Association for Cryptological Research*, vol. 20130313:162324, (Mar. 8, 2013), 1-27.
Park, Hyun-A, et al., "Efficient Keyword Index Search over Encrypted Documents of Groups", *Intelligence and Security Informatics*, (Jun. 17, 2008), 225-229.
Pinkas, Benny, et al., "Oblivious RAM Revisited", *International Associated for Cryptologic Research*, vol. 20100625:125210, (Jun. 22, 2010), 1-11.
Stefanov, Emil, et al., "Towards Practical Oblivious RAM", *ARXIV*, (Dec. 18, 2012).

* cited by examiner

PROCESS FOR OBTAINING CANDIDATE DATA FROM A REMOTE STORAGE SERVER FOR COMPARISON TO A DATA TO BE IDENTIFIED

TECHNICAL FIELD OF THE INVENTION

The invention relates to the field of identification processes, comprising the obtaining of candidate referenced data to be compared to a data to be identified, and the comparison of the candidate data with the data to be identified to detect a matching, for instance in order to carry out identification of individuals based on the comparison of some biometric features.

The invention can in particular be implemented in the field of cloud computing, wherein the data is stored by a remote storage server.

BACKGROUND ART

The rise of cloud computing leads to new opportunities for biometric applications. Large biometric databases can be stored at small cost on servers that are accessible by any device, even with low computational capacities. However, using remote databases on untrusted servers raises privacy issues, especially with biometric data that are particularly sensitive.

Two main concerns are the confidentiality of these data and the privacy of access patterns. Encryption alone is consequently insufficient, since it does not protect the access patterns. Furthermore, encrypting data can have a big impact on the usability of the database. If the user has to retrieve the whole database to perform an identification protocol, then he loses the benefit of outsourcing his data. It has been proposed in EP2248071 an identification protocol over encrypted biometric data that preserves the privacy of the users. The identification process follows the structure of the "Beacon Guided Search" (BGS) introduced by Hao et al. in the publication by F. Hao, J. Daugman, and P. Zielinsky, "A fast search algorithm for a large fuzzy database", *IEEE Transactions on Information Forensics and Security*, 3(2): 203-212, 2008.

In this scheme, to identify a biometric acquisition against a database, this acquisition is hashed by several locality-sensitive hash functions. These hash functions output, with good probability, the same value on data that are sufficiently close and different values for data that are sufficiently different.

More specifically, the mathematical definition of a Locality-Sensitive Hashing function (LSH function) is as follows: let B be a metric space, U a set with smaller dimensionality, $r_1, r_2 \in \mathbb{R}$ with $r_1 < r_2$, and $p_1, p_2 \in [0,1]$ with $p_1 > p_2$. A family $H = \{H_1, \ldots, H_k\}$, $H_j : B \rightarrow U$ is $(r_1, r_2, p_1, p_2)$-LSH if for all $h \in H$, $x$, $x' \in B$, $\Pr[h(x) = h(x')] > p_1$ if $d_B(x, x') < r_1$) and $\Pr[h(x) = h(x')] < p_2$ if $d_B(x, x') > r_2$.

The elements of the database that lead to common hashed values are then selected for full matching operations from which we can deduct the identification results.

The biometric references are stored in an encrypted fashion in one remote biometric database. In other remote database, the hashed values of these references are also encrypted and stored.

To achieve this scheme while preserving privacy of the access patterns, some cryptographic patterns known as private information retrieval (PIR) and private information storage (PIS) are used; that respectively enable to read from or to write on a database, without revealing the indices of the data that are read (resp. written).

Unfortunately, such protocols are not yet usable in practice, especially with the sizes of the databases and the number of requests considered in the aforementioned publication, as they are too costly in terms of computation time.

Moreover, the identification protocol disclosed in EP2248071 requires the use of Bloom filters, which make it even more costly in computation time and even less efficient.

For these reasons there is a need for providing a more efficient identification method, for using data stored in a remote storage system, which ensures both data confidentiality and privacy of the access patterns.

SUMMARY OF THE INVENTION

Thus, one object of the invention is to provide a process for obtaining candidate reference data to be compared to a data to be identified that can be implemented through the use of a remote storage server, and that ensures both confidentiality of the stored data and privacy of the access patterns to the remote server.

According to the invention, a process for obtaining candidate reference data to compare to a data to be identified is provided, implemented in a system comprising a client unit and a storage server comprising two databases, in which:
  the first database comprises a plurality of indexed memory blocks each comprising a corresponding encrypted indexed reference data, and
  the second database comprises memory blocks indexed by all possible hash values obtained by a plurality of k indexed hash functions, and wherein each block contains a list of the indexes of the reference data which hashing by one of said hash function results in the hash value corresponding to said block,
said process comprising the steps during which:
  the client unit hashes the data to be identified with each of the plurality of hash functions, and reads the k memory blocks of the second database corresponding to the hash values thus obtained,
  the client unit identifies indexes contained in at least t out of k read memory blocks, and
  the client unit reads the memory blocks of the first database indexed by the identified indexes in order to obtain the corresponding indexed reference data, said data being candidate data to compare to the data to be identified,
said process being characterized in that the steps of reading memory blocks of the databases are carried out by executing a protocol preventing the storage server from learning which memory blocks of the databases are read.

In some embodiments, the process can comprise the following features:
  the process further comprises the steps during which the client-unit decrypts the candidate reference data and compares each of said reference data to the data to be identified in order to detect a matching between the data and one reference data.
  the storage server and the client unit are configured to execute a distinct instance of an oblivious RAM protocol for each database, and in that the steps of reading memory blocks of the database are carried out using said Oblivious RAM protocol instances.
  reference data and the data to be identified are biometric data, and a matching between the data and a reference data leads to identifying the person to whom belongs the data to be identified to the person to whom belongs the reference data.

the reference data and the data to be identified are iris codes, the hash functions are projections of the iris codes on smaller bits sequences, and the comparison between the data to be identified and each reference data is carried out by computing the Hamming distance between said data.

the hash functions are of the locality-sensitive type, and all the hash values obtained by the hash functions are bits sequences which length m is strictly inferior to the length n of each reference data.

A data processing method is also provided, implemented in a system comprising a client unit and a storage server comprising two databases, in which:

the first database comprises a plurality of indexed memory blocks each comprising a corresponding encrypted indexed reference data, and the second database comprises memory blocks indexed by all possible hash values obtained by a plurality of k indexed hash functions, and wherein each block contains a list of the indexes of the reference data which hashing by one of said hash function results in the hash value corresponding to said block, the storage server and the client unit are configured to execute a distinct instance of an Oblivious RAM protocol for each database, said method being implemented by the client unit, for the execution of the aforementioned process, and comprising the steps during which the client unit:

hashes a data to be identified with each of the plurality of hash functions, and reads the k memory blocks of the second database corresponding to the hash values thus obtained, identifies indexes contained in at least t out of k read memory blocks, and reads the memory blocks of the first database indexed by the identified indexes in order to obtain the corresponding indexed reference data, and compares each of the said reference data to the data to be identified in order to detect a matching between the data and one reference data, wherein the steps of reading memory blocks of the databases are carried out using said Oblivious RAM protocol instances.

The invention also provides systems, units and computer program products for implementing said process and method.

A system for the secure storage and access to data is also provided, comprising a client unit, and a storage server comprising two databases, the system being configured to implement the aforementioned process, wherein:

the first database comprises indexed memory blocks each comprising a corresponding encrypted indexed reference data, and the second database comprises memory blocks indexed by all possible hash values obtained by a plurality of indexed hash functions, and wherein each block comprises a list of the indexes of the reference data which hashing by one of said hash functions results in the hash value corresponding to said block, said system being characterized in that the client unit and the storage server are configured to execute a distinct instance of an Oblivious RAM protocol for each database An initialization process is also provided for the above-mentioned system, comprising the steps during which:

the client unit selects a family of locality-sensitive hash functions, the storage server and the client unit set up two instances of an Oblivious RAM protocol for the databases, the client unit attributes a memory block index of the second database to each hash value obtained by each hash function.

A process is also provided for enrolling an i-th reference data in the above-mentioned system, comprising the steps during which:

the client unit writes in the memory block indexed by i of the first database the i-th reference data, the client unit computes, for each hash function, the hashing of the i-th reference data, and writes the index i of the reference data in all the memory block of the second database corresponding to the hash values thus obtained, wherein all the writing steps are carried out implementing an Oblivious RAM protocol.

BRIEF DESCRIPTION OF THE DRAWINGS

The features and advantages of the invention will be apparent from the following more detailed description of certain embodiments of the invention and as illustrated in the accompanying drawings, in which.

DETAILED DESCRIPTION OF A PREFERRED EMBODIMENT OF THE INVENTION

Figure 1:
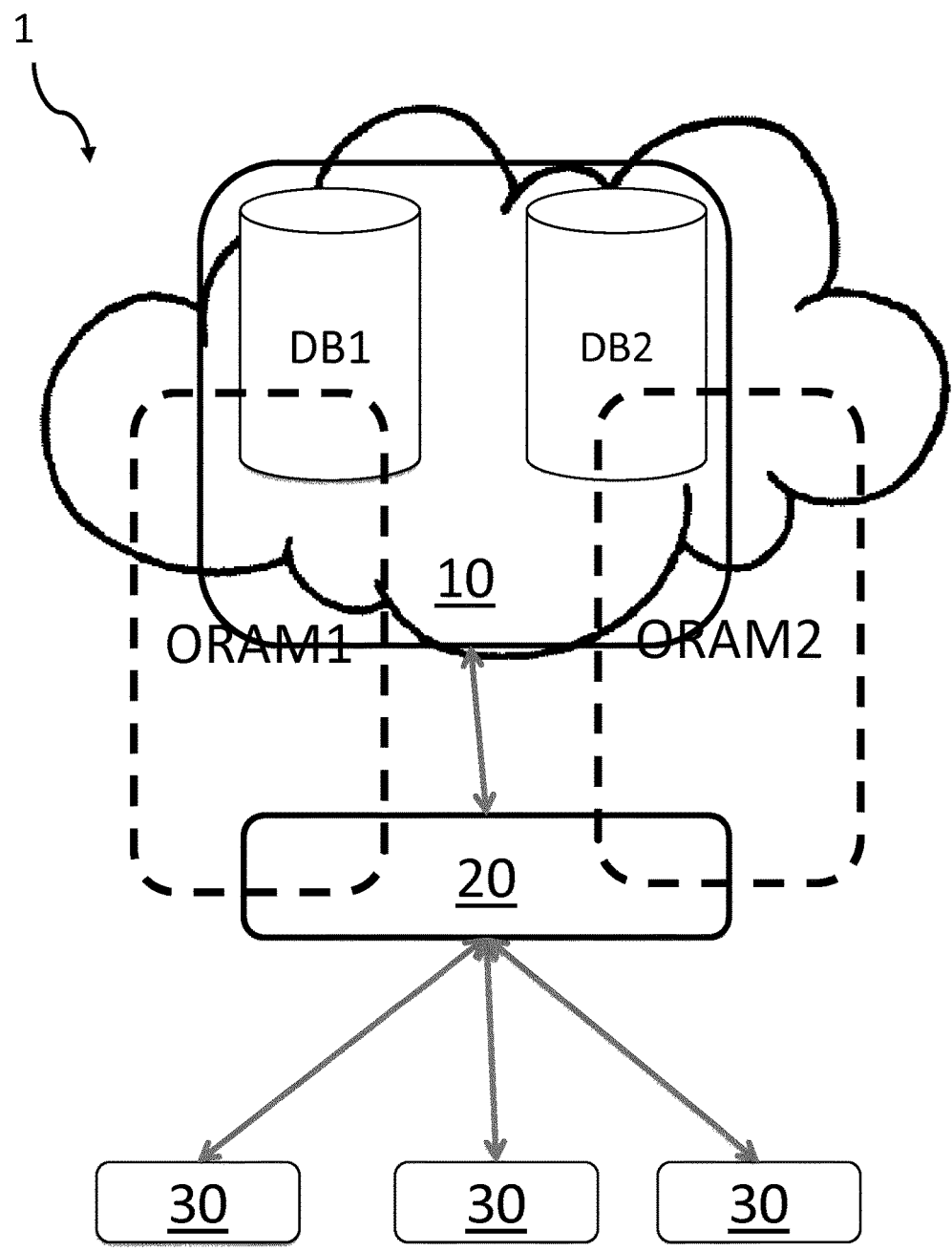
FIG. 1 schematically shows a system for secure comparison of data in which is implemented a process according to the invention.

With reference to FIG. 1, a system 1 for secure storage and access to data is shown.

The system 1 comprises a storage server 10, comprising two databases DB 1 and DB2.

The first database DB1 comprises N indexed memory blocks of n bits. In this database are stored reference data, such as biometric data. n is thus the bit length of each reference data stored in this database.

If reference data are biometric data, they can be of various natures, such as iris codes, fingerprints codes, etc.

As a non-limiting example, reference data can be iris codes, which can for instance be obtained using the encoding process disclosed in the publication by J. Daugman, "*How Iris Recognition Works*" (IEEE Transactions on Circuits and Systems for Video Technology, Vol 14, No. 1, January 2004). In this case each iris codes comprises iris bits describing a small zone of the iris $X=(X_1, \ldots, X_n)$ and mask information $M=(M_1, \ldots, M_n)$, which indicates zones of the iris that are not relevant for the identification, as they may be hidden by eyelids, lashes, reflects, or may be blurred, and which therefore must not be considered. One data comprising the iris and the mask is coded on 512 bytes.

The second database DB2 also comprises indexed memory blocks that are described below.

The system 1 also comprises a client unit 20, which can be for instance a server of a service provider for one or a plurality of clients 30 (which are not part of the system), the client unit 20 being configured to communicate with said clients 30. Said clients 30 can be mobile terminals, or else the client unit can itself be a data processing unit of a mobile terminal of a client having access to the storage server 10.

Advantageously, the storage server 10 (and its databases) is a remote server part of a public cloud, i.e. a server that is not part nor has any physical link with the client unit 20 but can be accessed through a network.

The databases are hence also remote from the client unit 20 and provide additional memory capacities to the client unit.

The storage server 10 and the client unit 20 are configured to carry out a protocol called Oblivious RAM protocol. More specifically, they are configured to implement two distinct instances of this protocol, one for each database.

Oblivious RAM (for Random-Access Memory) is a primitive for hiding storage access patterns, originally intended to hide a program's memory access patterns, as originally disclosed in the publication by O. Goldreich and R. Ostrovsky; "Software protection and simulation on oblivious rams", J. ACM, 43(3):431-473, 1996, 1, 2.

In the model of oblivious RAM, we consider a client C that stores data on a remote untrusted server S. The data of the client C consist in N blocks of size B bytes. The blocks are encrypted, in order to preserve their confidentiality, and they are organized in a specific way to preserve de client's privacy.

The client can make two kinds of requests.

A read request on a specified block u; and

A write request of a B bytes data on a specified block u.

An ORAM request is written (op,u,data), where op=read or write, u denotes the block that is being read or written and data is the data being written. The read request is thus written read(u) and the write request is written write(u,data).

When a client makes a request, this request is compiled by an ORAM construction into instructions for the server on this real storage that preserve privacy of the requests, i.e. instructions such that the server learns no information on the original request and cross-check different requests to infer some pieces of information.

Instead of using cryptographic techniques as in PIR constructions, oblivious RAM privacy guarantees are mostly based on the way the user accesses its remotely stored data. Consequently, operations performed by the client and the server have a very small cost, the performance measured being the ratio between the bandwidth required by the Oblivious RAM protocol and the bandwidth that would have been required for remote storage access without privacy considerations.

Another protocol than the Oblivious RAM may be implemented such that the oblivious storage, disclosed in the publication by M. T. Goodrich, M. Miztsenmacher, O. Ohrimenko, and R. Tamassia: "Practical oblivious storage", CODASPY 2012: 13-24.

An initialization process 100 of the system 1 is described with reference to FIG. 2.

The client unit 20 selects 110 a LSH family H of k (for instance k=128) indexed hash functions from B to U, where B is the space of the reference data stored in the first database, with n being the bit-length of the elements of B. Advantageously, the family is adapted to the biometric data involved in the identification process disclosed below.

Let m be the bit-length of the elements of U. Let $\phi(H,N)$ be an estimation of the maximum number of reference data, out of N being the maximum number of reference data stored in DB1, that will share the same output, over all possible outputs, of all k LSH functions of H.

In the example of data being iris codes, the hash functions are preferably projections of the part of the iris codes which does not contain the masks on smaller 10-bit vectors.

The client unit and the storage server set up, during a step 120, two instances of Oblivious RAM:

ORAM 1, than can deal with N blocks of n bits, and

ORAM 2, that can deal with 2 mk blocks of $\phi(H,N).\log 2(N)$ bits.

The client unit 20 also initializes the second database DB2 during a step 130, by indexing all the memory blocks of DB2 by all possible hash values obtained by the hash functions of H.

For instance, the indexes of the $2^m$ first blocks of DB2 will correspond to the $2^m$ possible hash values obtainable with $H_1$. The indexes of the $2^m$ next blocks will correspond to the $2^m$ possible hash values obtainable with $H_2$ etc.

Data processing comprises enrolment steps 200 for enrolling new reference data into the databases, and identification steps 300 when a user provides the client unit with a (possibly unregistered) data b, which is advantageously a biometric sample.

Figure 2:
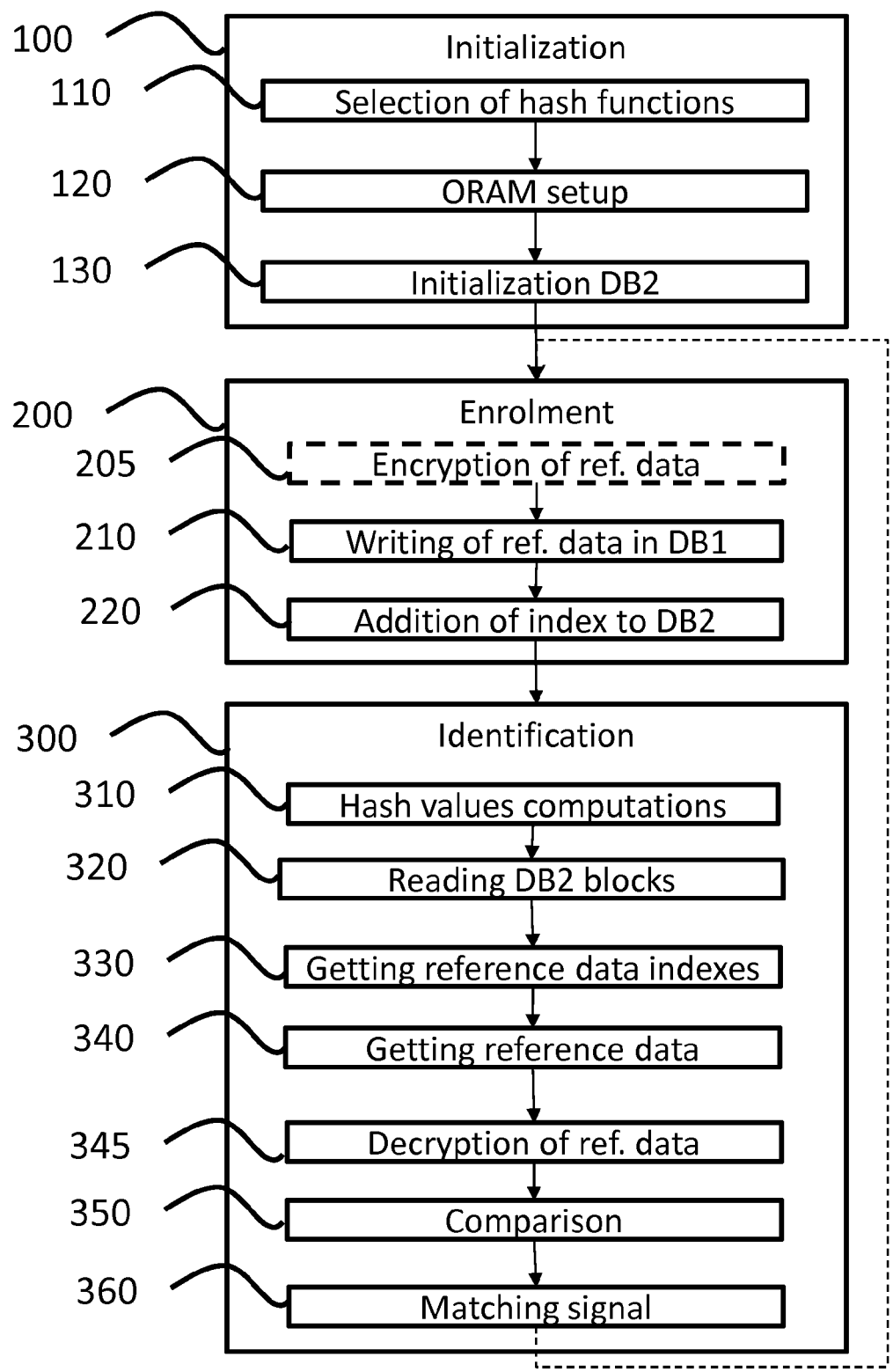
FIG. 2 shows the processing steps implemented by a system of FIG. 1 to achieve identification.

As shown on FIG. 2, enrolment steps 200 can be carried out for a number N'<N of reference data prior to implementing any identification steps. Additional enrolment steps can also be carried out for enrolling additional reference data in the databases afterwards, in order to complete the databases.

Figure 3A:
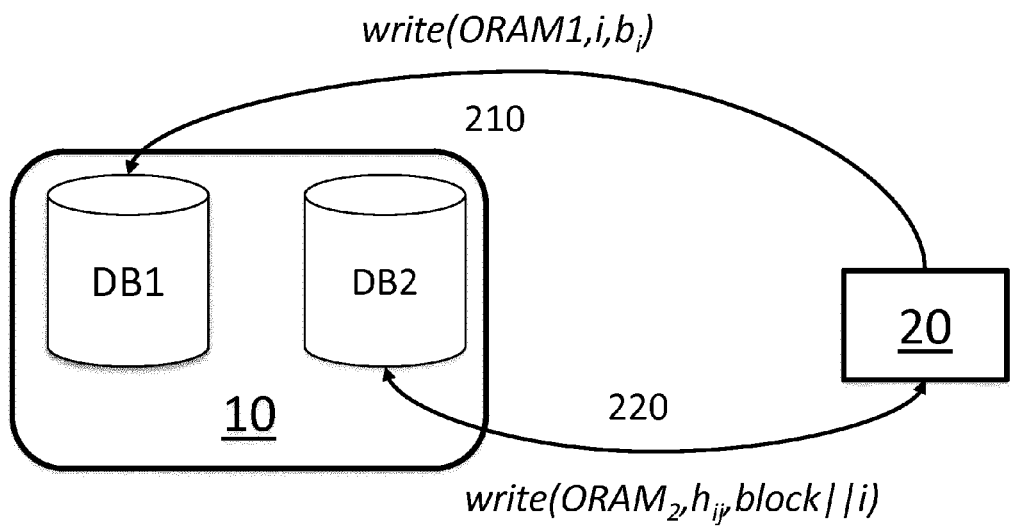
FIG. 3a shows the Oblivious RAM instructions executed during an enrolment process by the system of FIG. 1.

With reference to FIG. 3a, the enrolment of an i-th reference data $b_i$ into the databases, being i comprised between 0 and N, comprise a first step 210, during which the client unit 20 writes the reference data $b_i$ in the memory block indexed by i of the first database DB1, using an ORAM1 instruction, noted write(ORAM1,i,$b_i$)

All the reference data are enrolled in the first database DB1 under an encrypted form, as the remote server is untrusted. To this end, the client unit may receive via a secure connection (for instance from clients 30) or acquire the reference data under unencrypted form and encrypt them during a step 205 prior to enrolling them.

During a step 220, the client unit 20 computes the k hashed value of the reference data $b_i$, under an unencrypted form, obtained by each one of the k hash functions $H_1, \ldots, H_k$, denoted by $hi_1, \ldots hi_k$. For j=1, . . . , k, the client unit reads the memory block DB 2 indexed by $h_{ij}$, concatenates I to the content of this blocks and writes the modified content of this block at the same index $h_{ij}$. Thus, the client unit adds the index i of the enrolled reference data $b_i$ to the contents of all the memory blocks of DB2 corresponding to hash values of $b_i$ by the hash functions, using a write instruction of the ORAM2 instance.

The ORAM instructions are noted: block:=read(ORAM$_2$, $H_j(b)\|j$), then write(ORAM$_2$,$h_{ij}$,block$\|i$), where $\|$ denotes concatenation.

Figure 3B:
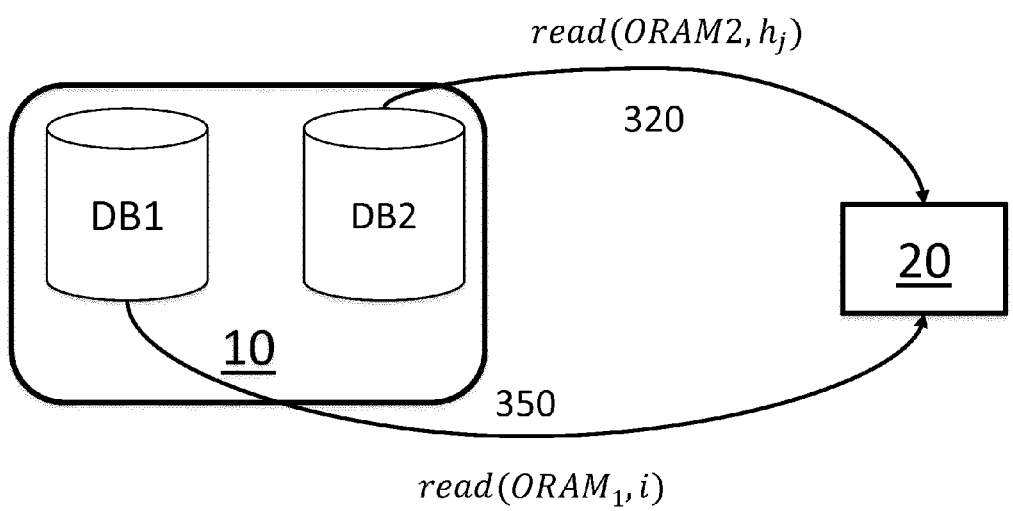
FIG. 3b shows the Oblivious RAM instructions executed during a process by the system of FIG. 1.

Then, as shown in FIG. 3b, an identification process 300 comprises the search in the first database and the obtaining of candidate reference data that may match a new and possibly unregistered data b to be identified. However, the matching is not searched for by comparing b to all the reference data stored in the first database as this process would be very require a high computation cost.

Thus, during the process of obtaining candidate reference data of an identification process, the client unit computes 310 the hash values of the data b to be identified obtained by every hash function.

The client unit makes k read requests 320 to the second database DB2, by implementing the ORAM 2 protocol, on the blocks indexed by the hashed value thus obtained by the hash functions $H_k$ out of the biometric data b to be identified. The k blocks thus obtained contain lists of indices of reference data having the same hash values by the same functions.

The ORAM instructions are as follows: for j=1, ..., k, let $h_j=(H_j(b)\|j)$, the client unit executes block$_j$=read (ORAM2,$h_j$).

The client unit looks 330 for the indices $i_1, \ldots, i_l$ that appear in at least t out of these k blocks, where t is a given threshold comprised between 0 and k, that is chosen as a trade-off between accuracy and efficiency. For instance t=3.

The client unit then gets 340 the candidate reference data indexed by using read calls by implementing the ORAM1 protocol associated with the first database DB1, $b_i$=read (ORAM$_1$,i), for i=$i_1, \ldots, i_l$.

The identification process based on the comparison of the candidate reference data to the data to be identified then comprises the comparison 350, by the client-unit, of the data b to be identified with each of these data.

In the case of data to be compared being iris codes, the comparison may be carried out by computing the Hamming Distance between a reference data and the data b to be identified.

The Hamming Distance is therefore written, for two data B1=(X1,M1) and B2=(X2,B2) to be compared:

$$HD(X, Y) = \frac{|(X \oplus Y \cap M1 \cap M2)|}{|M1 \cap M2|}$$

The comparison is preferably carried out between the data in unencrypted form, thus the client unit decrypts 345 the reference data prior to carrying out the comparison.

If there is a match between the data b and one of the reference data $b_i$, the identification process outputs 360 a signal indicative that a matching occurred. For instance the signal may be "1", or the index match. If there is no match, another signal, such as "0" may by output.

Thus, the proposed process allows to securely store reference biometric data in a remote database, and to easily access some of these data in order to perform identification without having to download the whole set of stored database.

The invention claimed is:

1. A process for obtaining candidate reference data to compare to a data to be identified, implemented in a system comprising a client unit and a storage server comprising two databases (DB1, DB2), in which:
the first database (DB1) comprises a plurality of indexed memory blocks each comprising a corresponding encrypted indexed reference data ($b_i$), and
the second database (DB2) comprises memory blocks indexed by all possible hash values obtained by a plurality of k indexed hash functions ($H_j$), and wherein each block contains a list of the indexes of the reference data ($b_i$) which hashing ($H_j(b_i)$) by one of said hash function ($H_j$) results in the hash value corresponding to said block,
said process comprising the steps during which:
the client unit hashes the data (b) to be identified with each of the plurality of hash functions ($H_j$), and reads the k memory blocks of the second database (DB2) corresponding to the hash values thus obtained,
the client unit identifies indexes ($i_1, \ldots i_1$) contained in at least t out of k read memory blocks, and
the client unit reads the memory blocks of the first database (DB1) indexed by the identified indexes ($i_1, \ldots i_1$) in order to obtain the corresponding indexed reference data ($b_{i1}, \ldots b_{i1}$), said data being candidate data to compare to the data to be identified,
the client unit decrypts the candidate reference data and compares each of said reference data ($b_{i1}, \ldots b_{i1}$) to the data (b) to be identified in order to detect a matching between the data (b) and one reference data,
wherein the steps of reading memory blocks of the databases are carried out by executing an oblivious RAM protocol preventing the storage server (10) from learning which memory blocks of the databases are read.

2. A process according to claim 1, characterized in that the storage server and the client unit are configured to execute a distinct instance (ORAM1, ORAM2) of an oblivious RAM protocol for each database (DB1, DB2), and in that the steps of reading memory blocks of the database are carried out using said Oblivious RAM protocol instances.

3. A process according to claim 1, wherein reference data ($b_i$) and the data (b) to be identified are biometric data, and a matching between the data (b) and a reference data ($b_i$) leads to identifying the person to whom belongs the data to be identified to the person to whom belongs the reference data.

4. A process according to claim 3, wherein the reference data ($b_i$) and the data (b) to be identified are iris codes, the hash functions are projections of the iris codes on smaller bits sequences, and the comparison between the data to be identified and each reference data is carried out by computing the Hamming distance between said data.

5. A process according to claim 1, wherein the hash functions ($H_j$) are of the locality-sensitive type, and all the hash values obtained by the hash functions ($H_j$) are bits sequences which length m is strictly inferior to the length n of each reference data.

6. A storage server (10), comprising:
a first database (DB1) that comprises a plurality of indexed memory blocks each comprising a corresponding encrypted indexed reference data ($b_i$), and
a second database (DB2) that comprises memory blocks indexed by all possible hash values obtained by a plurality of k indexed hash functions ($H_j$), and wherein each block contains a list of the indexes of the reference data ($b_1$) which hashing ($H_j(b_i)$) by one of said hash function ($H_j$) results in the hash value corresponding to said block,
wherein the storage server is configured to i) execute a distinct instance (ORAM1, ORAM2) of an Oblivious RAM protocol (ORAM1, ORAM2) for each database (DB1, DB2), and ii) communicate with a client unit which hashes the data ($b_i$) to be identified with each of the plurality of k indexed hash functions ($H_j$), and reads the k memory blocks of the second database (DB2) corresponding to the hash values thus obtained,
the client unit identifies indexes ($i_1, \ldots i_1$) contained in at least t out of k read memory blocks,
the client unit reads the memory blocks of the first database (DB1) indexed by the identified indexes ($i_1, \ldots i_1$) in order to obtain the corresponding indexed reference data ($b_{i1}, \ldots b_{i1}$), said data being candidate data to compare to the data to be identified, and
the client unit decrypts the candidate reference data and compares each of said reference data ($b_{i1}, \ldots b_{i1}$) to the data (b) to be identified in order to detect a matching between the data (b) and one reference data, and wherein said oblivious RAM protocol prevents the storage server from learning which memory blocks of the databases are read.

7. A data processing method implemented in a system comprising a client unit (20) and a storage server comprising two databases (DB1, DB2), in which:
the first database (DB1) comprises a plurality of indexed memory blocks each comprising a corresponding encrypted indexed reference data ($b_i$), and
the second database (DB2) comprises memory blocks indexed by all possible hash values obtained by a plurality of k indexed hash functions ($H_j$), and wherein each block contains a list of the indexes of the reference data ($b_i$) which hashing ($H_j(b_i)$) by one of said hash function ($H_j$) results in the hash value corresponding to said block,
the storage server and the client unit are configured to execute a distinct instance (ORAM1, ORAM2) of an Oblivious RAM protocol (ORAM1, ORAM2) for each database (DB1, DB2), said method being implemented by the client unit and comprising steps during which the client unit:
hashes a data (b) to be identified with each of the plurality of hash functions ($H_j$), and reads the k memory blocks of the second database (DB2) corresponding to the hash values thus obtained,
identifies indexes ($i_1, \ldots i_1$) contained in at least t out of k read memory blocks, and
reads the memory blocks of the first database (DB1) indexed by the identified indexes ($i_1, \ldots i_1$) in order to obtain the corresponding indexed reference data ($b_{i1}, \ldots b_{i1}$), and compares each of the said reference data ($b_{i1}, \ldots b_{i1}$) to the data (b) to be identified in order to detect a matching between the data (b) and one reference data,
wherein the steps of reading memory blocks of the databases are carried out using said Oblivious RAM protocol instances.

8. A system for the secure storage and access to data, comprising a client unit, and a storage server comprising two databases (DB1, DB2), wherein:
the first database (DB1) comprises indexed memory blocks each comprising a corresponding encrypted indexed reference data ($b_i$), and
the second database (DB2) comprises memory blocks indexed by all possible hash values obtained by a plurality of indexed hash functions ($H_j$), and wherein each block comprises a list of the indexes of the reference data ($b_1$) which hashing ($H_j(b_i)$) by one of said hash functions ($H_j$) results in the hash value corresponding to said block,
said system being characterized in that the client unit and the storage server are configured to execute a distinct instance of an Oblivious RAM (ORAM1, ORAM2) protocol for each database (DB1, DB2), and in that the system is configured to implement a method for obtaining candidate reference data to compare to a data to be identified, wherein the method comprises the steps during which:
the client unit hashes the data (b) to be identified with each of the plurality of hash functions ($H_j$), and reads the k memory blocks of the second database (DB2) corresponding to the hash values thus obtained,
the client unit identifies indexes ($i_1, \ldots i_1$) contained in at least t out of k read memory blocks, and
the client unit reads the memory blocks of the first database (DB1) indexed by the identified indexes in order to obtain the corresponding indexed reference data ($b_{i1}, \ldots b_{i1}$), said data being candidate data to compare to the data to be identified,
the client unit decrypts the candidate reference data and compares each of said reference data ($b_{i1}, \ldots b_{i1}$) to the data (b) to be identified in order to detect a matching between the data (b) and one reference data,
wherein the steps of reading memory blocks of the databases are carried out by executing an oblivious RAM protocol preventing the storage server from learning which memory blocks of the databases are read.

9. A system according to claim 8, wherein the system is further configured to perform an initialization method comprising the steps during which:
the client unit selects a family of locality-sensitive hash functions,
the storage server and the client unit set up two instances of an Oblivious RAM protocol for the databases,
the client unit attributes a memory block index of the second database to each hash value obtained by each hash function.

10. A system according to claim 8, wherein the system is further configured to perform a method for enrolling an i-th reference data, comprising the steps during which:
the client unit writes in the memory block indexed by i of the first database the i-th reference data ($b_i$),
the client unit computes, for each hash function, the hashing of the i-th reference data, and writes the index i of the reference data in all the memory block of the second database corresponding to the hash values thus obtained,
wherein all the writing steps are carried out implementing an Oblivious RAM protocol.

* * * * *